United States Patent [19]
DeBrouse

[11] Patent Number: 5,920,053
[45] Date of Patent: Jul. 6, 1999

[54] PASSENGER IDENTIFICATION AND BAGGAGE CONTROL SYSTEM

[76] Inventor: Cynthia R. DeBrouse, 4100 Chardel Rd., Apt. 2B, Baltimore, Md. 21236

[21] Appl. No.: 08/779,214

[22] Filed: Jan. 6, 1997

[51] Int. Cl.⁶ .............................. G06F 17/00; G07B 15/02
[52] U.S. Cl. ........................... 235/375; 235/376; 235/384
[58] Field of Search ................................... 235/375, 376, 235/384; 364/401, 463

[56] References Cited

U.S. PATENT DOCUMENTS

| | | | |
|---|---|---|---|
| 3,994,085 | 11/1976 | Groselak | 40/21 |
| 4,199,045 | 4/1980 | Machler | 190/49 |
| 4,277,902 | 7/1981 | Miniaci et al. | 40/2 R |
| 4,408,406 | 10/1983 | Barton | 40/19 |
| 4,711,994 | 12/1987 | Greenberg | 235/384 |
| 5,051,565 | 9/1991 | Wolfran | 235/384 |
| 5,225,990 | 7/1993 | Bunce et al. | 364/478 |
| 5,401,944 | 3/1995 | Bravman et al. | 235/375 |
| 5,560,657 | 10/1996 | Morgan | 283/80 |

*Primary Examiner*—Anita Pellman Gross
*Assistant Examiner*—Daniel St. Cyr
*Attorney, Agent, or Firm*—Scally, Scally & McMahon; Richard M. McMahon, Sr.

[57] ABSTRACT

This invention relates to a Baggage Control System and in particular to a Passenger Photograph Identification System for improving security and control of passenger baggage. This invention reveals both a system and a method which improve the security of passenger bags checked by the airline for transportation on the flight or flights on which the passenger is traveling. This system also insures that unattended baggage does not get on the plane without a review by the airline officials, and reduces lost or misdirected passenger luggage by the airline. The system allows rapid identification of any misdirected luggage to the proper owner by the airline, and a computer printout of the photographs of all boarded passengers.

9 Claims, 5 Drawing Sheets

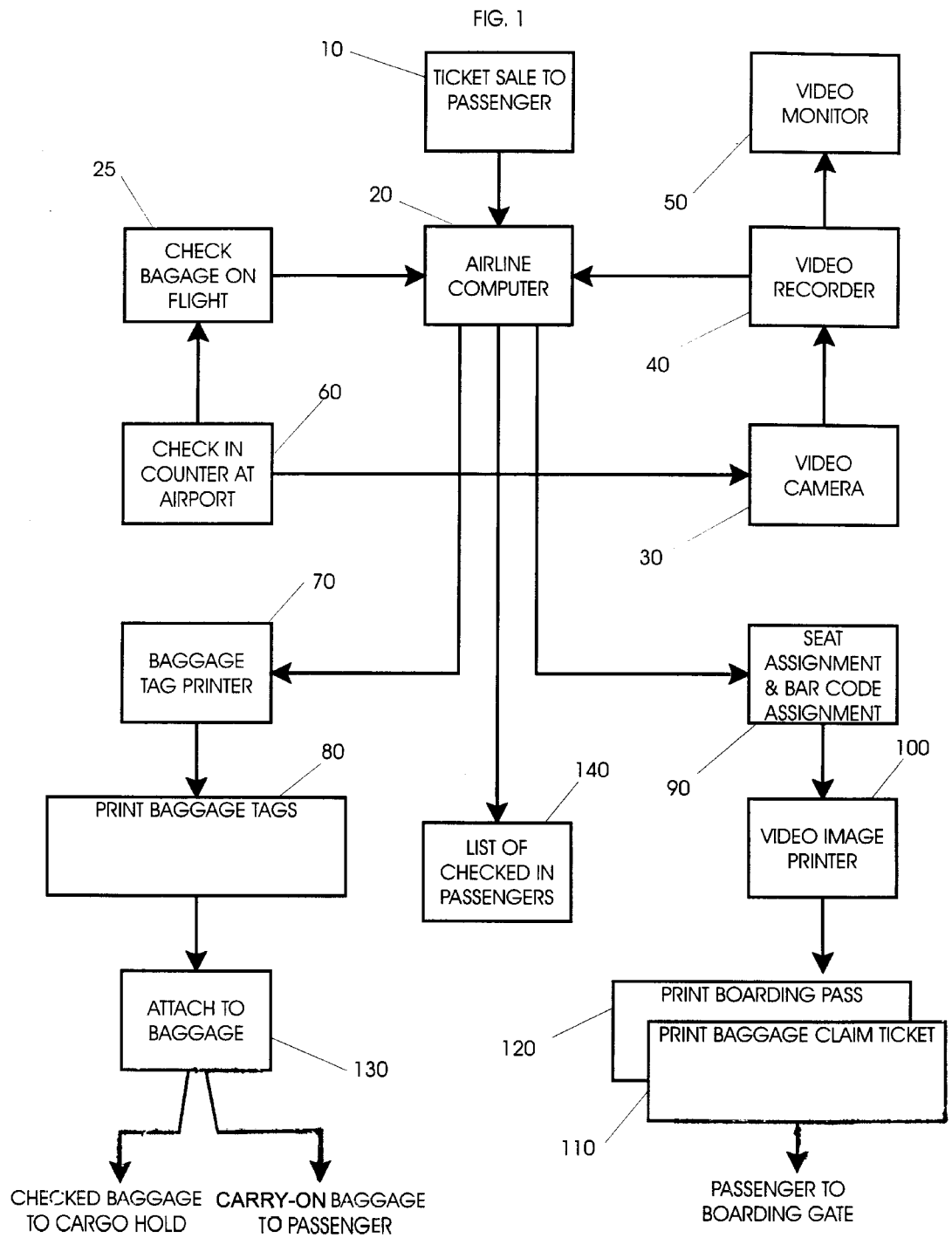

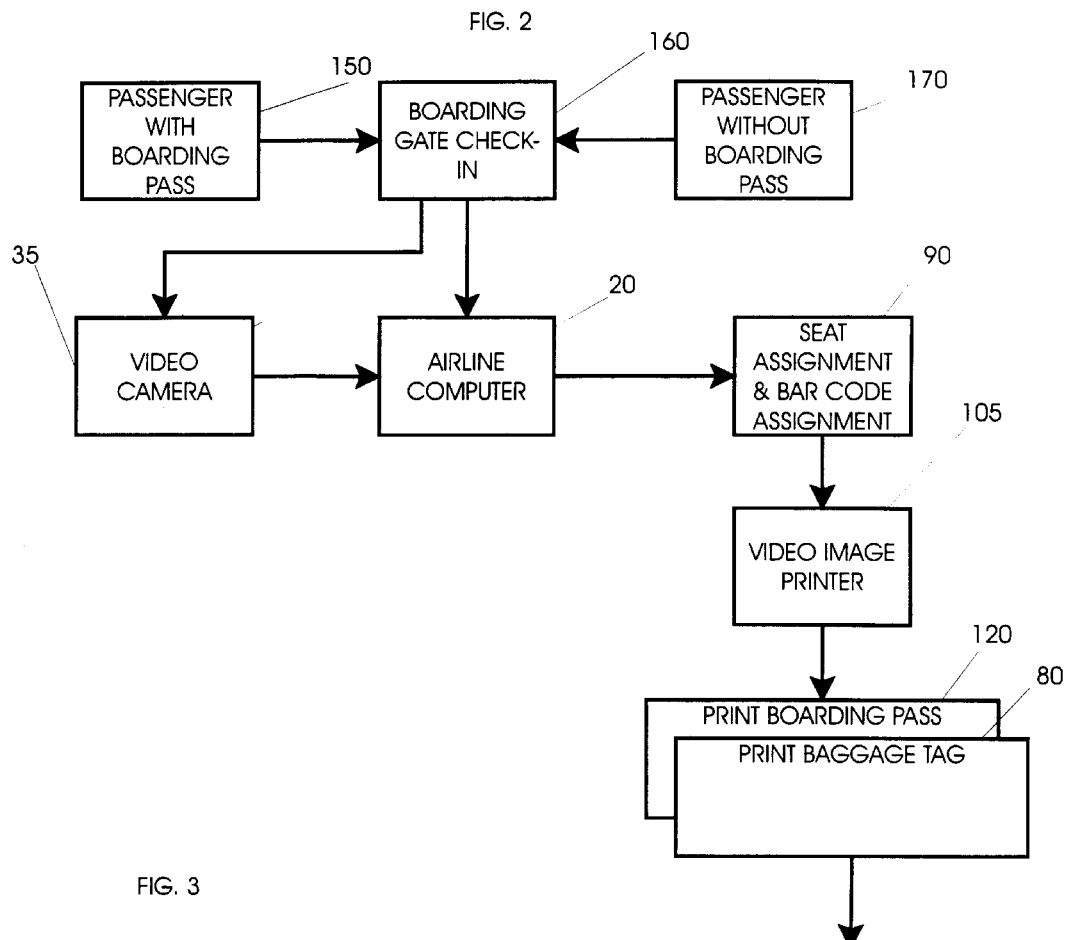
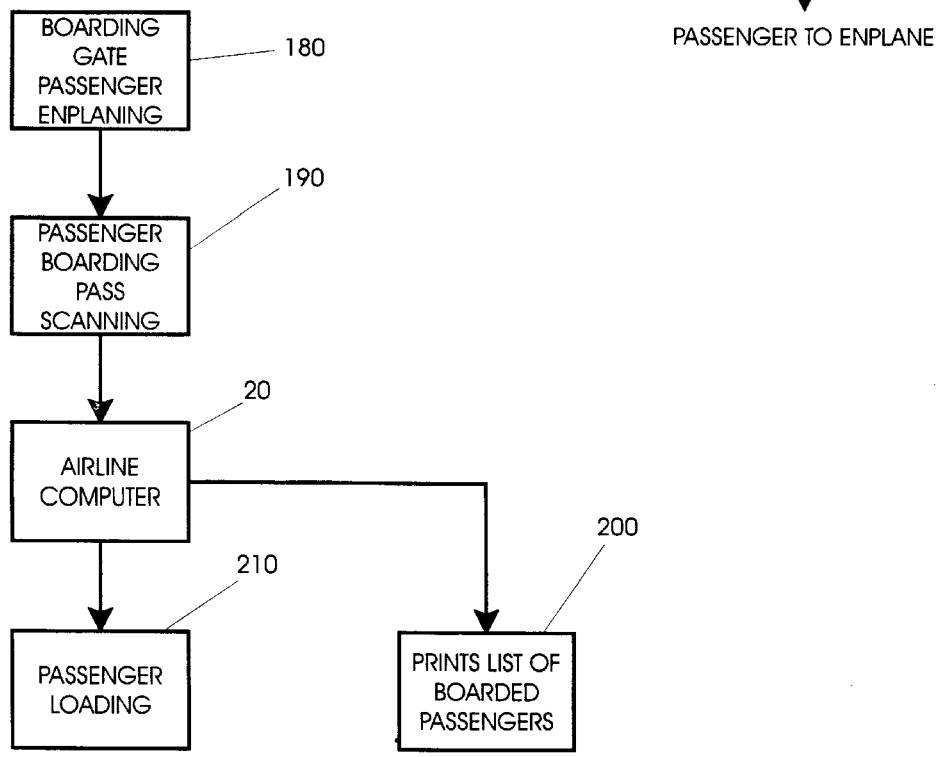

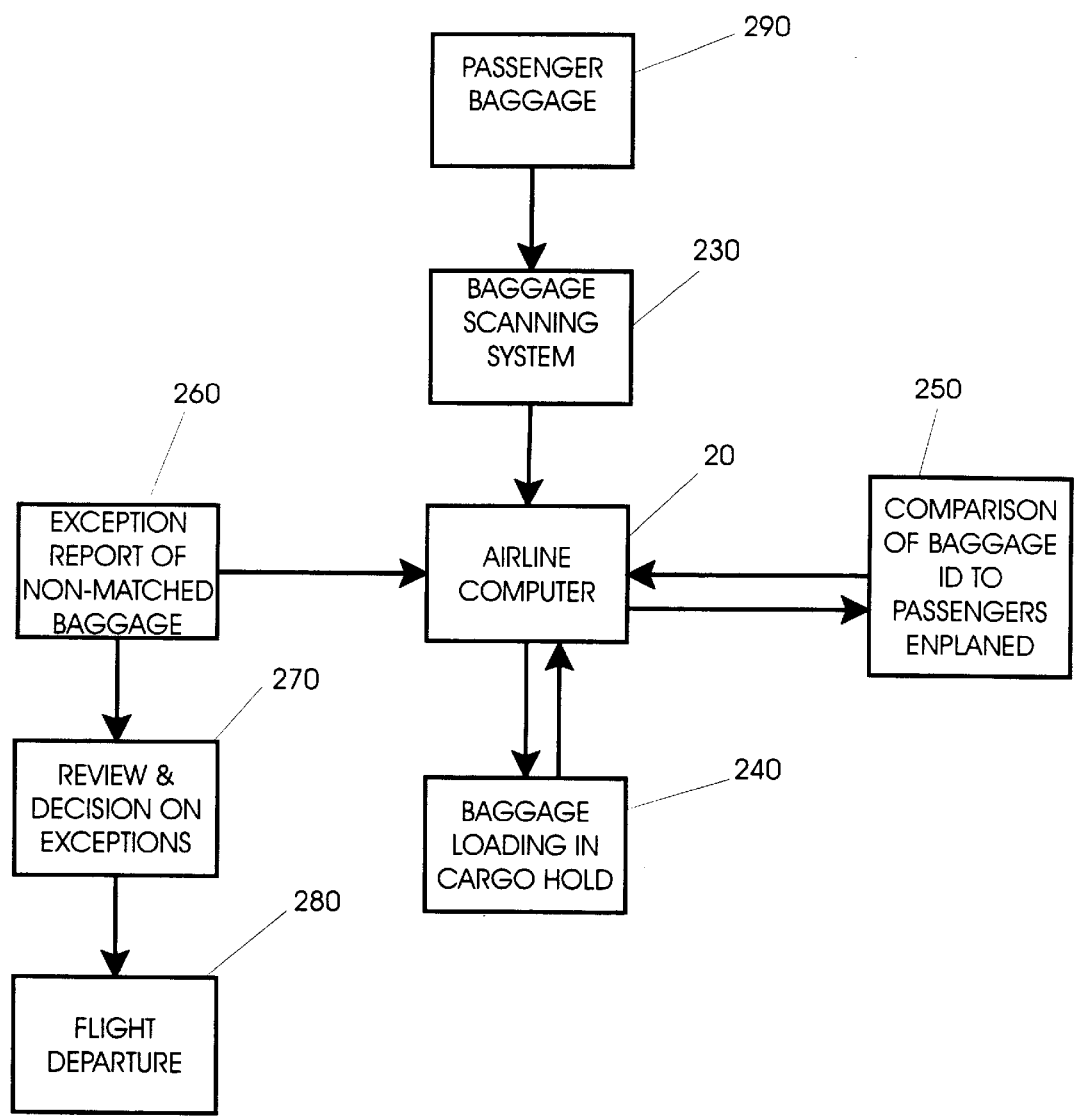

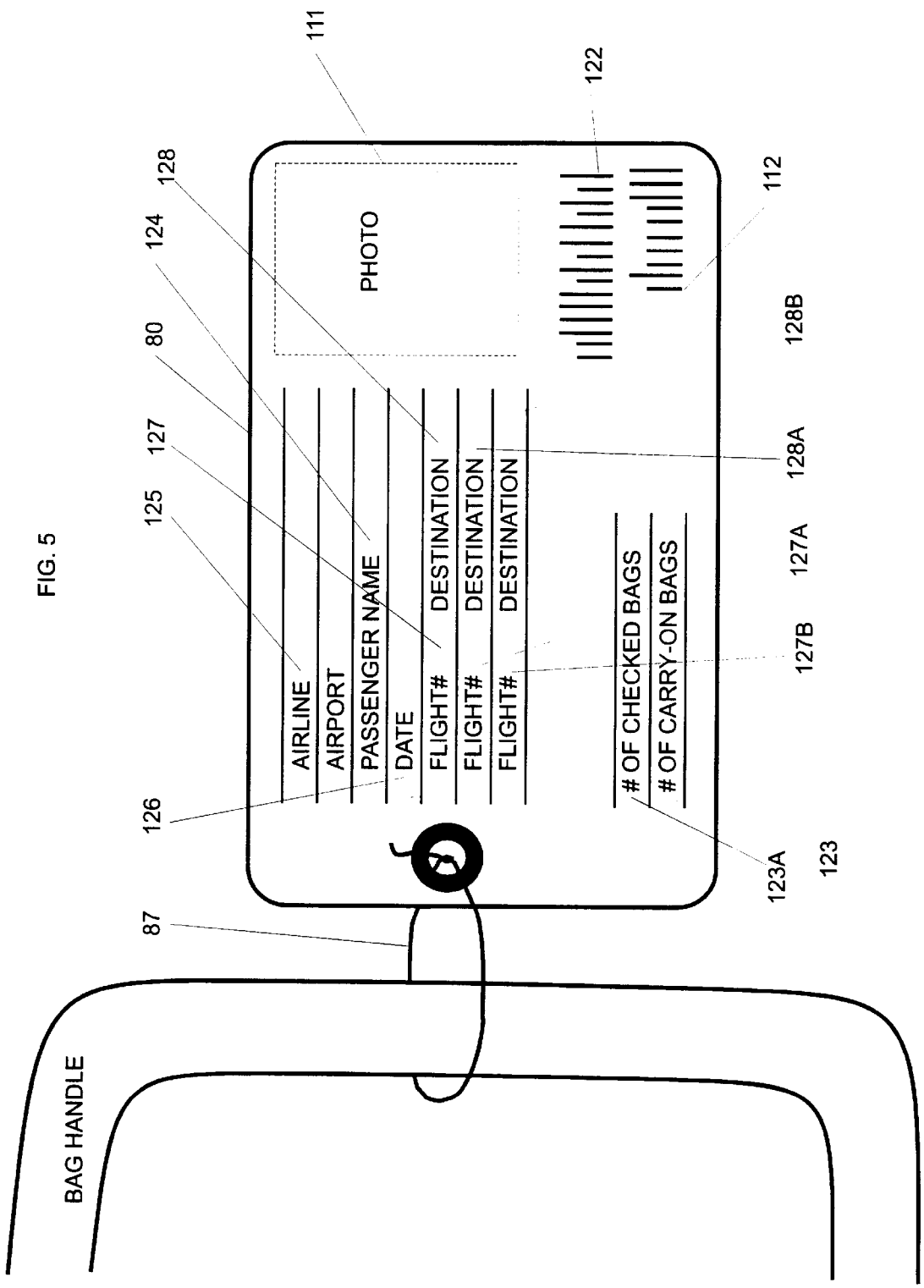

PASSENGER IDENTIFICATION AND BAGGAGE CONTROL SYSTEM

BACKGROUND OF THE INVENTION

This invention relates in general to baggage control systems and in particular to control of airline baggage. Various baggage identification tracking and control methods are presently in use by airlines. The usual system consists of a passenger checking his or her luggage at the airline check-in counter at the airport for the departing flight. The airline agent places a tag with a pre-assigned sequential number on each individual piece of luggage and removes or tears off the same pre-assigned sequential number, baggage claim number, enters it into the computer airline record for that passenger, and attaches the baggage claim check to the ticket jacket into which the airline ticket and boarding pass have been placed. The luggage is placed on a conveyor belt system for that airline which delivers the baggage to a sorting area. The baggage handlers at the sorting area then sort the arriving luggage into individual departing flights and accumulate the baggage on carts. The carts are hooked together and pulled by a tractor unit to the departing flight for loading onto the plane for that particular flight.

Little or no control exists in checking to determine if a passenger holding a ticket for a specific flight had checked baggage at the airline check-in lobby but failed to board the flight. Thereby, this procedure introduces questions as to why baggage was checked on a flight when there was no matching boarding passenger. Other critical security issues and questions arise from this system and practices.

At destination the procedure for a passenger claiming his or her luggage vary substantially. The usual procedure is for arriving passengers to proceed to a baggage claim area for the specific airline flight. Arriving baggage is delivered to that area by the airline by unloading the baggage from the cargo holds of the arriving plane onto a baggage cart; then moving all the carts for a particular flight to the baggage claim station assigned for that particular flight. The luggage is unloaded from the delivery carts where the passenger locates his or her luggage and compares the baggage claim check number in the passenger ticket jacket for each article checked with the bag tag/label attached to the individual piece of luggage. Some airports have an airline or security agent who verifies that the correct match was made before the arriving passenger is permitted to leave the baggage claim area with luggage. Other airports and airlines do not require this verification step.

This invention was conceived to simplify and speed up the identification of ownership of airline checked baggage. This invention and resulting improved baggage control system was specifically developed to address the concern for security and control of airline checked baggage. The invention also provides more efficient baggage control and reduces the overall security risk with both baggage and passengers for the individual airline, whereby if a passenger who previously checked bags hasn't enplaned for a specific flight, that individual's baggage can rapidly be identified and removed from the baggage that actually will be transported with that particular flight.

This invention also has the capability, as part of the computer system, to print out on demand the photographs of all passengers and a complete manifest with the names of all boarded passengers. This feature provides an efficient security improvement to the airline in the event such information is needed in an emergency.

A known technology is described in U.S. Pat. No. 5,401,944—Issued to Brayman & Wang—Titled "Traveler Security and Luggage Control System". This patent discloses the use of a bar code to identify a passenger's luggage and provides for a tracking and control system. The bar code is also used on the boarding pass and the system disclosed in this lengthy patent describes the match/comparison checking for each enplaning passenger. This patent also teaches a method of integrated passenger identification for use in other travel services such as rental car companies, hotels, and similar travel services. The Brayman & Wang patent discloses several improvements to existing airline baggage control systems. However, it does not reveal a photo identification component or suggest the improvements disclosed in the present invention.

U.S. Pat. No. 5,225,990 issued to Bunce, Everett, Pathan, & Williams for "Apparatus and Methods for Baggage Reconciliation and Location" discloses a baggage checking system for use in airports which utilize passenger identification data, baggage tag numbers, and flight numbers; and the system collates this information with the baggage tag numbers and flight number read at the baggage loading station. An alarm is given if an incorrect flight number is read, and additionally an alarm is provided if an attempt is made to load a bag with the same tag number. Logic rules can also be established for this system providing the precise local conditions under which an alarm is given during loading.

This patent, along with U.S. Pat. No. 5,401,944 discussed above disclose the basic concept of comparison of the passenger identification to the baggage identification data in the instance where a ticketed individual does not enplane the particular flight to which that ticketed individual had already checked in any baggage. However, this patent also does not disclose a photo identification system of baggage control as in the present invention.

U.S. Pat. No. 5,051,565—Issued to Wolfram—Titled "Baggage and Passenger Matching Method and System". This patent expired on Sep. 25, 1995 for failure to pay the required maintenance fee to the PTO. The patent reveals a system and a method for correlating all loaded baggage with enplaning passengers during the boarding process by matching the machine readable code imprinted on the boarding pass to that machine readable code on the baggage tag.

This patent includes a video camera system which is used to take a picture of each passenger at check-in. This passenger photo is printed out on an adhesive label which is attached to the boarding pass. This patent specifically points out that the instant photograph produced in this system is attached to the boarding pass and not to the baggage tags. The patent has three claims, two of which are independent claims with a video photographic system component.

In U.S. Pat. No. 4,711,994—Issued to Greenberg—Titled "Security System for Correlating Passengers and Their Baggage". The patent reveals a method for maintaining close security surveillance of both passengers and their baggage on a public conveyance to insure there is a positive indication that baggage is not loaded without the proper match to a boarding passenger.

In this system all baggage checked by a passenger on an airline is provided a machine readable coded tag or sticker which is affixed to both the ticket/boarding pass as well as to the baggage tags. After the passenger has surrendered the ticket/boarding pass and boarded the aircraft, the matching coded baggage will then be loaded. This invention is specifically addressed to anticipating and avoiding the problem of loading baggage of the "no show" airline ticket purchaser thereby reducing the security risk associated with the "no show" baggage. It is patentably distinct from the subject invention.

U.S. Pat. No. 4,277,902—Issued to Miniaci & Christiansen—Titled "Baggage Identification Tag" discloses a baggage identification tag with pre-printed passenger identification information which is completed by the individual passenger checking baggage during the airline check-in process. This patent addresses the materials, basic passenger pre-printed identification information, and the manufacturing construction of the baggage tag/label and its resulting durability, strength, adhesive, etc. This invention is also patentably distinct from the present invention.

Another technology is revealed in U.S. Pat. No. 3,994,085—Issued to Groselak & Podgor—Titled "Baggage Tag" which discloses a baggage tag which is formed from a single continuous sheet of material which is pre-printed for entry of passenger identification information. The tag assembly also includes a detachable baggage claim check. This tag assembly is constructed so that the identification portion, after completion by the passenger at check-in is inserted through the luggage handle and folded over so the passenger identification information is concealed from sight. The claim check number for each piece of baggage is readily visible and can be easily inspected for comparison to the baggage claim check.

Authorized airline personnel may break the seal which holds the baggage tag together exposing the complete passenger identification information. Once the seal is broken, it cannot be resealed, and the broken seal will be readily apparent to the passenger upon inspection of the baggage tag assembly. This patent is similar to U.S. Pat. No. 4,277,902 in that both patents are addressed to construction of the baggage tag itself, and are distinguishable from the present invention.

The advantages of this invention will be readily appreciated as the same becomes better understood by reference to the following detailed description when considered by the accompanying drawings.

BRIEF DESCRIPTION OF DRAWINGS

FIG. 1 is a flow chart representation of the system and the method of, this invention FIG. 2 is a detailed flow chart/block diagram of the boarding gate check-in system of this invention FIG. 3 is a detailed flow chart/block diagram of the boarding gate explaining system of this invention FIG. 4 is a detailed flow chart/block diagram of the baggage loading portion of this invention FIG. 5 is a layout depicting the baggage tag showing a personal photo and bar code identification

SUMMARY OF THE INVENTION

Figure 6:
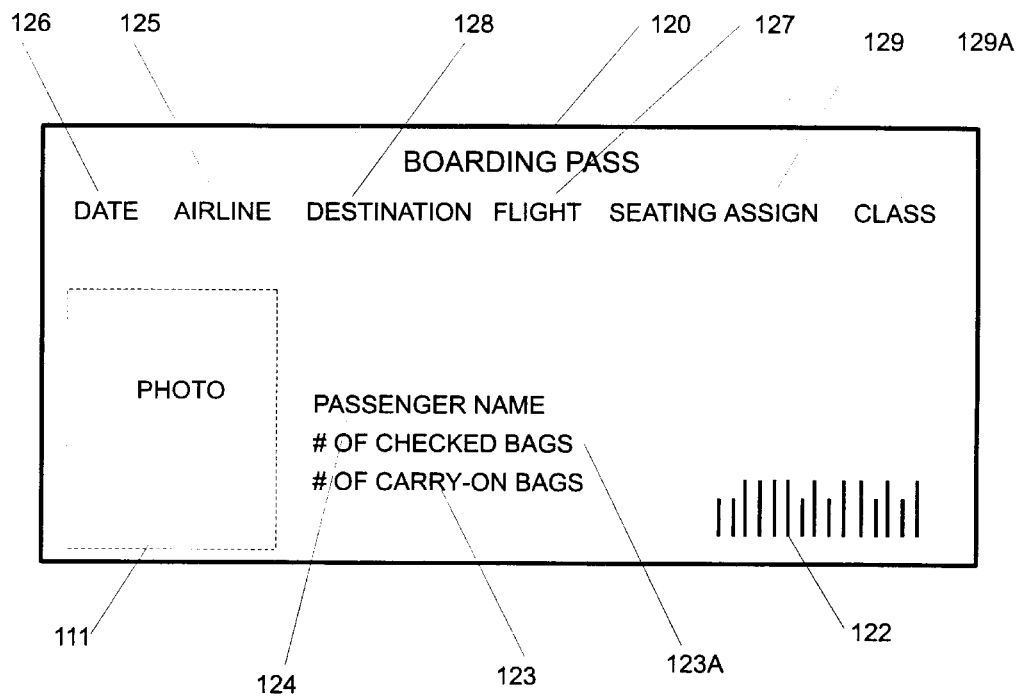
FIG. 6 is a layout depicting the boarding pass showing a passenger photo and bar code identification

In accordance with the invention, a passenger identification and baggage control system wherein a photograph of each passenger for a departing flight is taken and stored in the airline computer system. A unique machine readable bar code is assigned to each passenger and to each piece of luggage by the computer. The passenger photo and bar code identification are printed on each boarding pass, each baggage claim ticket check, and each baggage tag attached to the individual checked bag. The baggage identification bar code is scanned before loading the bag into the cargo hold of the departing flight. It is compared by the computer to the passenger identification and baggage identification bar codes on the passenger boarding pass which is scanned for each explaining passenger. An exception list is printed by the computer for any baggage which does not match the current flight number or for which the ticketed passenger did not board the plane. The airline computer system has the ability to printout on demand the photographs of all passengers and a complete manifest with the names of all boarded passengers on a particular flight and the number of pieces of luggage for each passenger.

DETAILED DESCRIPTION

Referring to the drawings for a better understanding of the present invention, this invention is susceptible to embodiment in several different forms. The description which follows should be viewed as an illustration of the principles of the invention and is not intended to limit this invention to the embodiments illustrated in the drawings herein.

FIG. 1 is an overall view of the system and the method taught by this invention. FIG. 1 depicts a passenger checking in luggage for a departing flight at the airport check-in counter. The Ticket Sale 10 to the passenger can take place at an off-site location such as a travel agency, airline ticket office, or airline ticket issuance device. The passenger purchases or presents the airline ticket at the Check-In Counter 60 of the airline at the airport along with any Baggage 25 that is to be checked to the destination. The number of pieces of luggage and the ticket identification is entered into the Airline Computer 20 by the airline agent. A photograph of each passenger is taken by Video Camera 30 which, as an option in this system can be recorded by Video Recorder 40 and displayed on Video Monitor 50. The computer system makes a Passenger Seat Assignment 90 for all the departing and/or connecting flights. Pre-assignment of seats is also handled by the computer by comparison to the existing seat assignment file for each flight. Computer System 20 also assigns a separate machine readable bar code 122 to each passenger and a unique bar code 112 to the first passenger bag, 112A to the second passenger bag, and 112B to the third passenger bag if multiple bags are to be checked or carried onto the flight. Video Image Printer 100 prints the Baggage claim Ticket 110, shown in detail in FIG. 7 which shows separately baggage identification codes for each piece of luggage. Boarding Pass 120 is shown in detail in FIG. 6.

Computer System 20 also provides electronic communication to Baggage Tag Printer 70 which prints Baggage Tag 80 for each individual bag checked or to be carried on by the passenger which is shown in detail in FIG. 5 with Machine Readable Bar Code 122 for each passenger identification and Passenger Photo 111. A separate Baggage Tag 80 is printed with a unique Bar Code 112 for the first passenger bag, unique Bar Code 112A is assigned and printed for the second passenger bag on a second Baggage Tag 80 with an exact duplicate on all other information shown on Boarding Pass 120 and Baggage Tag 80 printed for passenger bag number 1, unique Bar Code 112B is assigned and printed for the third passenger bag on the third Baggage Tag 80 with an exact duplicate of all other information shown on Boarding Pass 120 and Baggage Tag 80 printed for passenger bags number 1 and number 2. A printed Baggage Tag 80 is attached to each bag 130 by the airline agent and the checked-in bags with Baggage Tag 80 attached are sent to the loading area. The passenger receives their carry-on baggage with Baggage Tag 80 attached.

Sorting of checked baggage can be done at any interim point by scanning the Baggage Tag 80 with a hand held bar code scanner to read the Passenger Bar Code 122, and Baggage Identification Bar Codes 112, 112A, and 112B which link the luggage to a particular passenger, flight number, destination and gate via Airline Computer 20.

Computer 20 can produce a complete List 140 of checked-in passengers for any particular flight on demand. This List 140 of checked-in passengers can be transmitted via Computer System 20 to the flight boarding gate to assist in the Boarding Gate Check-In Process 160 as shown in FIG. 2.

As shown in FIG. 2, Passengers 150 for a specific flight may arrive at the Boarding Gate 160 with a Boarding Pass 120. These same passengers have already checked baggage and received one or more Baggage claim Tickets 110. If the Passenger 170 did not stop at the airline check-in counter before proceeding to the boarding gate, no boarding pass will have been issued for the flight and the passenger will have no checked-in luggage but may still have carry-on luggage only. In this case, the airline gate agent will take the photograph of Passenger 170 with Video Camera 35 and input to Airline Computer 20 which will also make or confirm the seat assignment for the departing and/or connecting flights. Pre-assignment of seats for the passenger is handled in the identical method as described for a passenger who stopped at the Airport Check-In Counter 60. Computer System 20 assigns a machine readable passenger identification bar code 122 to each such ticketed passenger. Baggage Identification Bar Code 112 is made by Computer System 20 for each individual piece of carry-on baggage. Baggage claim Ticket 110 is printed, Baggage Tag 80 is produced and the carry-on luggage is tagged even though no luggage has been checked by the passenger.

A Boarding Pass 120 is printed at the boarding gate which is shown in FIG. 6. Boarding Pass 120 also contains the Passenger Photo 111, Passenger Identification Bar Code 122, Number of Carry-On Bags 123, Number of Checked Bags 123A, Passenger Name 124, Airline 125, Date 126, Flight 121, Destination of Flight 128, Seating Assignment 129, and Class 129A as shown in FIG. 6.

FIG. 3 shows the process of Explaining 180 whereby the airline gate agent takes the Ticket 10 of each explaining passenger and scans the passenger identification bar code 122 on the Boarding Pass 120 with a Hand Held Scanner 190 linked to Computer System 20. Airline Computer System 20 compares the Passenger Identification Bar Code 122 to the computer record for each passenger on the list of Checked-In Passengers 140. A report flashes on the screen and an exception report is printed for any exceptions. The passenger proceeds to board the Plane 210 while a complete list of Boarded Passengers 200 is prepared on demand.

FIG. 4 shows the baggage loading portion of this invention with each piece of sorted Passenger Baggage 290 with a Baggage Tag 80 affixed to it is scanned by the Baggage Scanning System 230 prior to loading into the cargo hold 240 of the departing flight. This scanning system 230 can be either hand held or mounted on a material handling device.

Scanning Device 230 is linked to Airline Computer System 20 which compares the Passenger Identification Bar Code 122 and Baggage Identification Bar Code 112 on each Baggage Tag 80 to the computer file of scanned Passenger Identification Bar Codes 122 on each Boarding Pass 120 of enplaned passengers as a part of the Verification Process 250 of this system. An Exception Report 260 is generated and displayed in printed form and on a monitor showing the Passenger Name 124, Identification Number 122, and Baggage Identification Numbers 112, 112A, 112B for any such passenger whose luggage was scanned for loading on a particular flight which doesn't match the enplaned passenger file information. A review and Decision Step 270 by a senior airline operations manager is required based on Exception Report 260 in order to proceed with Flight Departure 280. If an error occurs in loading the baggage in Cargo Hold 240, it is identified, the exception baggage is then removed from the cargo hold and the Verification Process 250 is run again on Computer System 20 prior to Flight Departure 280.

FIG. 5 shows Baggage Tag 80 in detail with Passenger Photo 111, Passenger Identification Bar Code 122, Number of Carry-On Bags 123, Number of Checked Bags 123A, Baggage Identification Bar Code 112 if one bag, Baggage Identification Bar Code 112A if two bags, and Baggage Identification Codes 112B if three bags are checked or carried on, Passenger Name 124, Airline 125, Date 126, Flight 127 if non-stop to final destination; Flight 127A for first connecting flight to connecting destination 128A, and Flight 127B for second connecting flight to Final Destination 128B. FIG. 5 also shows Baggage Tag Tie 87 which is used to attach Baggage Tag 80 to the luggage. Baggage Tag 87 can be constructed of plastic, wire, teflon or string material. Baggage Tag 87 also can be constructed of a clear adhesive backed tape containing a tamper proof dye strip which will visibly show if the Baggage Tag 80 attachment to the baggage has been removed or altered.

Figure 7:
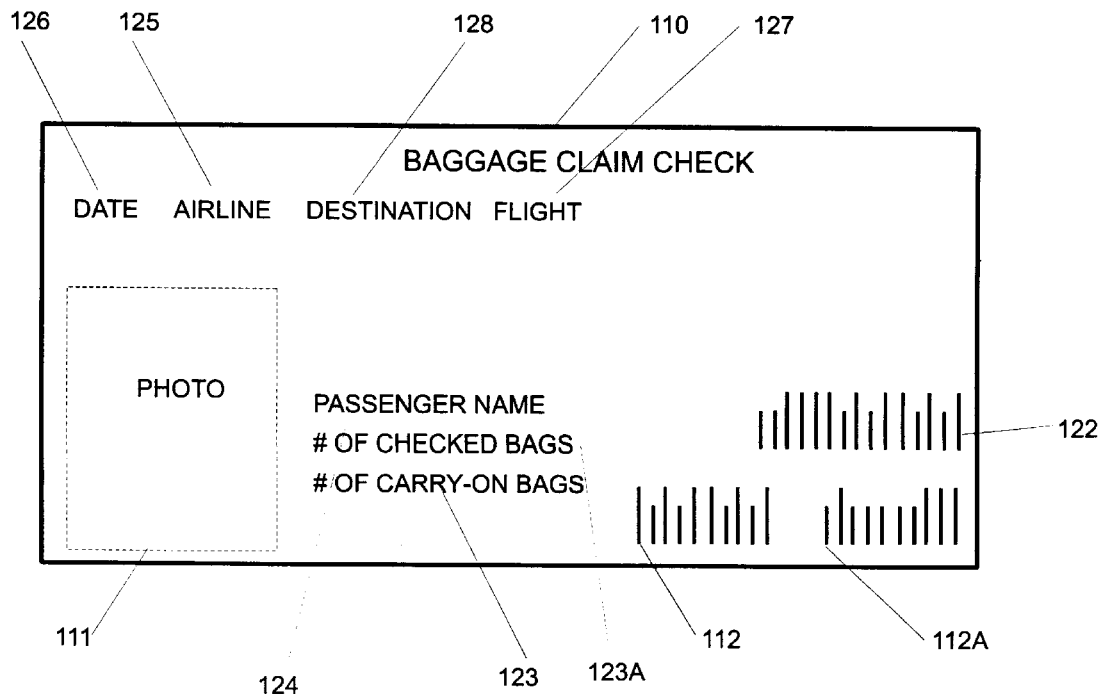
FIG. 7 is a layout depicting the baggage claim check showing a passenger photo and bar code identification

FIG. 7 shows Baggage claim Check 110 in detail with the Passenger Photo 111, Passenger Identification Bar Code 122, Baggage Identification Bar Code 112 if one bag, Baggage Identification Bar Codes 112 and 112A if two bags, and Baggage Identification Bar Codes 112, 112A, and 112B if two bags are checked and there is one carry-on bag, Number of Carry-On Bags 123, Number of Checked Bags 123A, Passenger name 124, Airline 125, Date 126, and Flight 127.

The system, process, and method of the invention will be disclosed, explained and communicated broadly to passengers and all airline personnel. The system described herein is applied to airlines. However, this system and controls are equally applicable to other pubic transportation systems; namely railroads, bus lines, and ship lines. The hardware and system described are similarly described in terms of public air travel. Other variations and embodiments are visioned by the inventor, and many variations will occur to those skilled in the art without departing from the spirit and scope of the invention.

Therefore, the foregoing is considered as illustrative of the principles of the invention. Further, since numerous modifications and equivalents may be resorted to, falling within the scope of this invention.

What is claimed as new and the inventor desires to secure by Letters of Patent of the United States is:

1. A traveler management and control system for matching the identity of a passenger boarding a public transportation system with that passenger's baggage comprising:

A video camera for use in combination with a video image printer for producing a passenger boarding pass, boarding tag, and baggage claim ticket with a photographic image of the passenger on each document, together with a means of generating unique machine readable bar codes for passenger identification and for each individual bag identification, a means of passenger seat assignment which is stored as a component of the system and incorporated into the printed images on the boarding pass, baggage tag, and baggage claim tickets; a means of scanning and matching the passenger identification and baggage identification bar codes to the said passenger and baggage unique identification bar codes on the boarding pass, baggage tag, and baggage claim ticket, and a means for indicating the presence or absence of a match for each record, wherein said baggage tag is attached to each check-in bag with a coated clear adhesive backed tape containing a tamper proof dye strip which will be visibly show if the baggage tag or its attachment to the checked-in bag has been tampered with, altered, or removed from the bag.

2. A traveler management and control system in accordance with claim 1 wherein the system includes a video recorder and video monitor to enhance security.

3. A traveler management and control system in accordance with claim 1 which includes a station in the baggage claim area at the arrival public transportation terminal wherein the unique passenger and baggage identification bar code on the baggage tag attached to each checked-in bag picked up by a passenger is scanned and compared to the unique identification bar codes on the baggage claim ticket of that passenger prior to physical release of the bag from the arrival station, with the failure to match as the criteria for retention of the baggage by the carrier.

4. A traveler management and control system in accordance with claim 1 wherein the unique identification code of each piece of baggage loaded is compared to the baggage identification codes on file for the flight for each enplaned passenger with approval of any exception required before departure of the flight.

5. A traveler management and control system in accordance with claim 1 wherein a computer printout of all passenger names and photographs is generated.

6. A method of passenger identification and control of baggage for public transportation comprising a passenger photograph which is printed with passenger name and flight information; a unique machine readable bar code generated to identify each passenger; a unique machine readable bar code generated to identify each piece of passenger checked-in baggage; whereby each passenger is photographed at check-in by a video camera, and a means of individual seat assignment is integrated into the system having distinct codes for passenger identification printed on boarding passes, baggage tags, and baggage claim tickets; and said method includes the process whereby the boarding pass of each explaning passenger is scanned for passenger's unique identification bar code and is compared to the passenger unique identification bar code on the baggage tag attached to each checked-in bag loaded with an exception report being generated for any bag which is not matched to an explaning passenger unique identification bar code, and a complete inventory of all boarded passengers is available prior to departure wherein said baggage tag is attached to each check-in bag with a coated clear adhesive backed tape containing a tamper proof dye strip which will be visibly show if the baggage tag or its attachment to the checked-in bag has been tampered with, altered, or removed from the bag.

7. The method specified in accordance with claim 6 wherein the method includes use of a video recorder and video monitor to enhance security.

8. The method specified in accordance with claim 6 wherein an additional step in the process includes a station in the baggage claim area at the arrival public transportation terminal wherein the unique passenger and baggage identification bar code on the baggage tag attached to each checked-in bag picked up by a passenger is scanned and compared to the unique identification bar code on the baggage claim ticket of that passenger prior to physical release of the bag from the arrival station, with the failure to match as the criteria for retention of the baggage by the carrier.

9. The method specified in accordance with claim 6 wherein a computer printout of all passenger names and photographs is generated.

* * * * *